United States Patent [19]

Müller

[11] 4,182,392

[45] Jan. 8, 1980

[54] PROTECTIVE TIRE CHAIN

[75] Inventor: Anton Müller, Aalen-Unterkocken, Fed. Rep. of Germany

[73] Assignee: Eisen und Drahtwerk Erlau Aktiengesellschaft, Aalen, Fed. Rep. of Germany

[21] Appl. No.: 885,386

[22] Filed: Mar. 10, 1978

Related U.S. Application Data

[63] Continuation of Ser. No. 696,080, Jun. 14, 1976, abandoned.

[30] Foreign Application Priority Data

Jun. 13, 1975 [DE] Fed. Rep. of Germany ....... 2526413

[51] Int. Cl.² ............................................. B60C 27/12
[52] U.S. Cl. .................................. 152/219; 152/242
[58] Field of Search ........... 152/217, 218, 219, 213 A, 152/233, 241, 242

[56] References Cited

U.S. PATENT DOCUMENTS

| | | | |
|---|---|---|---|
| 1,561,897 | 11/1926 | Allcutt et al. ................... | 152/219 X |
| 1,633,512 | 6/1927 | Bateson .......................... | 152/219 X |
| 1,717,558 | 6/1929 | Hanson ........................... | 152/219 X |
| 1,764,811 | 6/1930 | Spinney .......................... | 152/219 X |
| 2,012,404 | 8/1935 | Reyburn .......................... | 152/219 |
| 2,472,768 | 6/1949 | Carroll ........................... | 152/241 |
| 2,639,753 | 5/1953 | Pike .............................. | 152/219 X |

*Primary Examiner*—Francis J. Bartuska
*Attorney, Agent, or Firm*—Becker & Becker, Inc.

[57] ABSTRACT

A protective tire chain having a running section and lateral sections which comprise at least one tensioning device for tensioning the tire chain. The tensioning device is by means of two link members linked to links of the tire chain. These two link members are continuously spring urged toward each other so that the tensioning device continuously tends to assume its shortest overall length and consequently to tighten the chain. The two link members are, however, also movable away from each other against the spring thrust into a position in which the tensioning device has its maximum overall length or at least a considerably greater length than its shortest possible length. The tensioning device is provided with an unlatchable locking device which is operable selectively to lock the tensioning device in its maximum or longer length position to facilitate the mounting of the tensioning device.

6 Claims, 12 Drawing Figures

PROTECTIVE TIRE CHAIN

This is a continuation application of Ser. No. 696,080, filed June 14, 1976 (Monday) now abandoned and being based on German Patent Application Ser. No. P2526413.5 filed June 13, 1975 as claimed for priority under 35 USC 119.

The present invention relates to a time chain with a tread portion and side portions which comprise at least a tensioning device for tensioning the tire chain to its condition of operation, said tensioning device comprising two link members which are movable into a stretched-out position. This tensioning device is adapted by means of said link members to be linked to links of the tire chain.

U.S. Pat. No. 2,020,943 describes a tire chain of the above mentioned general type in which the lateral part is elastically expandable. The links of the side part are for this purpose embedded in an elastic material or are provided with tensioning springs. For purposes of placing the lateral part onto the tire, it is necessary to preload the lateral part against the spring force. This is relatively complicated because the lateral part rests against the tire, and also because the tire as a rule is surrounded by a wheel box of the motor vehicle so that the lateral part is accessible only under great difficulties.

It is, therefore, an object of the present invention to provide a tire chain of the above mentioned general type in which the lateral part when being placed upon the tire does not have to be stretched against the spring force of the tensioning device, and in which the tensioning device can be preloaded without exerting a pull load upon the lateral part.

These and other objects and advantages of the invention will appear more clearly from the following specification in connection with the accompanying drawings, in which.

Figure 1:
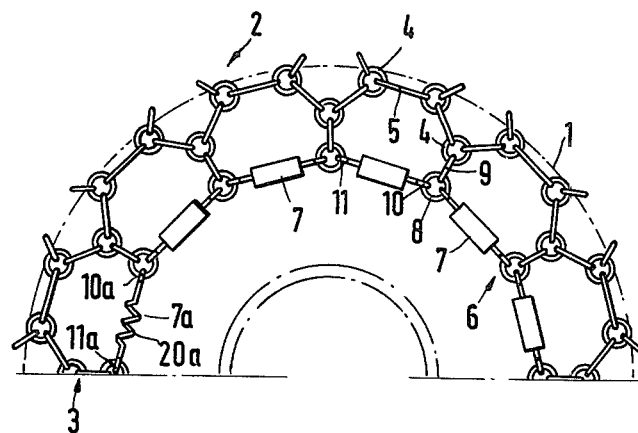
FIG. 1 illustrates a side view of a tire chain according to the invention in condition of operation.

The tire chain according to the invention comprises a tread or running section and lateral sections which include at least one tensioning device which for tensioning the tire chain is in condition of operation linked to links of the tire chain by means of two link members which are resiliently movable relative to each other into a stretched-out position. The tire chain according to the invention is characterized primarily in that the link members of the tensioning device are in approximately the stretched-out position held in their relative position with regard to each other by means of a latching mechanism adapted to be unlatched. In this way, the tensioning device can prior to applying the tire chain to the tire be stretched out and can be secured in this stretched-out position. After the tire chain has been placed on the tire, the latching mechanism is unlatched so that the link members of the tensioning device will under spring force move in the direction toward each other until the lateral part and thus the tire chain is tensioned. Depending on the size of the tire chain, also a plurality of such tensioning devices may be provided in the lateral part of the tire chain. Inasmuch as each tensioning device by itself can be locked in its stretched-out position, only relatively low forces are required for this purpose. By means of the number of the tensioning devices which are unlatched after the tire chain has been placed on the tire, the tension of the tire chain can be ascertained. Not all tensioning devices have to be of the type which can be locked. Also, nonlatchable tensioning devices designed as simple tension or pressure springs may be provided. These tensioning devices may for instance alternately be arranged in the lateral part of the tire chain. The tensioning devices which cannot be lock may also include springs which are preloaded in the relieved condition of the tensioning device.

In view of the wear of the chain links at their contact points, the tire chain is widened after it has been in use for some time. By means of the tensioning device, however, the tire chain is currently post tensioned so that always a proper fit of the tire chain on the tire will be assured. Furthermore, overloads on the tire chain which could be caused by jerky movements, racing of the vehicle wheels, changing in the steering angle of the vehicle wheels while the vehicle is standing still, or the like, will be avoided because the parts of the chain which are provided with the resilient tensioning device according to the invention are elastically stretched and can yield in conformity with the loads. By a suitable arrangement of the tensioning device, the tire chain can also be prevented from being lifted off the tires by a centrifugal force whereby otherwise damage to the tire chain may occur.

The tensioning device or devices may be arranged in the inner and/or outer lateral part and/or on a central chain located between two running parts. Such tire chain with two running parts is provided for twin wheels with which each of the two tires is engaged by one running part.

With such a tire chain, the tensioning devices may also be arranged adjacent to each other between the two running parts or two adjacent middle chains or the like in such a way that adjacent to the two tire flanks facing each other, there is located at least one tensioning device. A lateral part need not be provided with a tensioning device so that this lateral part, when in condition of operation, will always have the same inner diameter. Since the outer lateral part in most instances extends over the pertaining flank of the tire over a greater height than the inner lateral part extends over the inner flank, it is expedient not to provide a tensioning device at the outer lateral part. This will avoid that the outer lateral part in view of the post-tightening pass into the region of the wheel rim, hit the same during operation and be damaged thereby. The inner lateral part which comprises the tensioning device or devices has a considerably greater inner diameter than the outer lateral part so that the inner lateral part when being post-tightened will not pass into the region of the rim. When the entire post tightening stroke of the tensioning devices has been used up during the post-tightening of the tire chain, at least one tightening device may be removed from the tire chain and may be replaced by a shorter chain link. In this way, the diameter of the pertaining part of the tire chain is reduced to such an extent that the remaining tensioning devices can again be used for post tensioning.

That part of the tire chain which comprises the tensioning device or devices may during the assembly on the tire be tightened by means of an auxilliary device for instance a tightening lever to such an extent that the tensioning devices are stretched into their maximum length. In order to assure that the auxilliary device can be removed after the tightening of the tire chain, it is detachably connected to the tire chain.

The design according to the present invention is particularly suitable for tire protective chains which serve as an armor-like protection of the tire against damage by the road. Such tire chains are used for instance in mining operations in which the tires can easily be damaged by the rocky ground over which they drive. Such ground also greatly increases the wear of the chain links of the tire chain. This is also the reason why tire chains heretofore used in mining operations frequently had to be post-tightened by hand.

Referring now to the drawings in detail, the tire chain illustrated in FIG. 1 is applied to a tire 1 illustrated in dot-dash lines and has a net-shaped running part 2 which is intended for arrangement on the tread or running surface of the tire 1. The tire chain furthermore comprises two lateral parts of which only the inner lateral part 3 is shown. The lateral parts are intended for engaging the flanks of the tires and are likewise net-shaped. The running part and the lateral parts may have the same configurations. The running part and the lateral part comprise annular links 4 which are located parallel to the plane of the stretched chain. The running part and lateral parts furthermore comprise web links 5 which are linked to the annular links 4 in such a way that they stand at a right angle to the tire surface or to the plane of the stretched tire chain. Each annular link 4 is engaged by three web links 5 arranged at an angle with regard to each other, whereas each web link 5 is pivotally connected to two adjacent annular links 4. Each annular link 4 engages a corner of a polygonal net section of the tire chain.

That marginal portion of the lateral part 3 which faces away from the running part 2 is formed by a lateral chain 6. The lateral chain 6 is formed by tensioning devices 7, 7a which are aligned and are interconnected by annular links 8 which latter are expediently designed like the annular links 4. In the specific showing of FIG. 1, the tensioning devices and annular links 7 alternate with each other in such a way that each annular link 8 is pivotally engaged by two tensioning devices and more specifically by those ends thereof which face each other. Each annular link 8 of the lateral chain 6 is through the intervention of a web link 9 located at a right angle to the tire chain pivotally connected to an adjacent annular link 4. The web links 9 are expediently designed as detachable hook links so that the lateral chain 6 can as an entirety be withdrawn from the remaining tire chain. The hook openings of the web links 9 expediently engage the annular links 8 of the lateral chain 6. The tensioning devices 7, 7a are preloaded in such a way that the lateral chain 6 and thus the tire chain are continuously under a predetermined pull tension and that the lateral chain 6 in condition of operation is made narrower in conformity with the inner wear of the tire chain and in conformity with the wear of the tire 1. Each tensioning device is at those ends thereof which face away from each other provided with two links 10, 11 and 10a 11a by means of which the tensioning device is suspended in the adjacent annular links 8 of the tire chain 6.

Figures 2, 3:
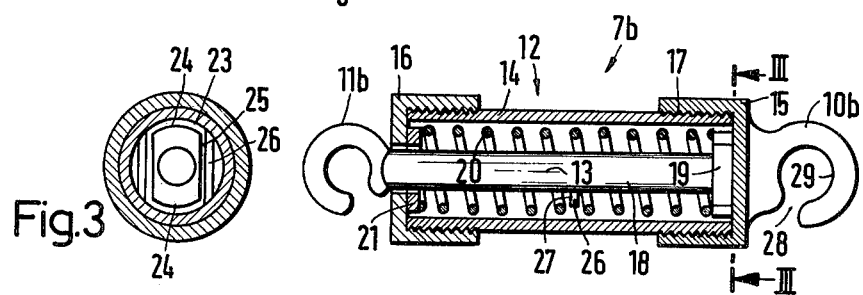
FIG. 2 represents an axial section through the tensioning device according to the invention for the tire chain of FIG. 1.
FIG. 3 represents a section taken along the line III—III of FIG. 2.

The tensioning device 7b according to FIGS. 2 and 3 comprises a housing 12 which is substantially symmetrically designed with regard to its axis 13 and which is formed by a cylindrical sleeve 14 and two end caps 15, 16 which are connected to the ends of sleeve 14. Sleeve 14 may in a simple manner be formed by a section of a tube. The ends of sleeve 14 are provided with outer threads 17 having screwed thereon the end caps 15, 16 in such a way that they are tensioned against the end surfaces of sleeve 14. A link 10b is rigidly connected to the pertaining end cap 15 and is provided at the outer end face of cap 15. The other link 11b is displaceable in the longitudinal direction of the tensioning device relative to the housing 12. This link 11b is connected to the outer end of a cylindrical shank 18 which is coaxial with the axis 13 and has its inner end in engagement with the housing 12. At the inner end of shank 18 the diameter of which is considerably shorter than the inner diameter of the housing 12, there is provided a flange or collar 19 which has an annular disc shape. The outer diameter of said flange 19 is slightly shorter than the inner diameter of the housing 12 so that it is guided in said housing. The shank 18 is within the housing 12 surrounded by a helical pressure spring 20 which has one end resting against that end face of flange 19 which faces the link 11 and has its other end resting against the oppositely located inner surface of housing 12. For the engagement of this end, the inner side of the pertaining end cap 16 has arranged thereon an annular disc 21 which has nearly the same outer diameter as the flange 19. When the tensioning device 7b is at its shortest condition, the flange 19 engages the inner end face of the pertaining end cap 17 of housing 12 under the thrust of the preloaded helical pressure spring 20. From this position, the displaceable link 11b can by the other link 10b be pulled away against the thrust of spring 20 until the windings of the helical pressure spring 20 contact each other thereby determining the longest condition of the tensioning device. As a result thereof, the spring of the tensioning device cannot be overloaded or damaged.

The spring 20 the outer diameter of which nearly equals the inner diameter of the housing 12 is safely guided in the housing.

In the condition in which the tensioning device 7b has its greatest length, the links 10b, 11b may be positively locked relative to each other. As a result thereof, the tensioning device can be mounted in a very simple manner. Following the completion of the mounting operation, the interlock 23 is disengaged so that the links 10b, 11b are again moved toward each other by the spring 20 until the tire chain is tensioned. At the inner end of the shank 18 there are provided two locks 24 which are diametrically oppositely located with regard to each other. These locks 24 are formed by sections of the collar 19. The collar or flange 19 is at two sides oppositely located to each other provided with plane flattened portions 25 which are parallel to each other and which at their ends confine on both sides the locks 24 curved about the axis 13. For purposes of engagement of said locks 24, two protrusions 26 are arranged in housing 12, which are located opposite to each other on both sides of the axis 13. These protrusions 26 are located at a right angle to the axis 13 and at those sides thereof which face the link 11b are respectively provided with a shoulder 27. The distance of that side of each protrusion 26 which faces the axis 13 from the axis 13 is slightly greater than the distance between the flattened portions 25 and the axis 13 and is less than the distance of the end faces of locks 24 from the axis 13. The two flattened portions 25 as well as the two protrusions 26 are symmetrically located with regard to an axial plane of the axis 13. The protrusions 26 are formed in a simple manner by pins which with both ends engage the housing 12 or sleeve 14 while being firmly located therein. The ends of the pin may for instance be press fitted into bores. The link member 11b and shank 18 are displaceably and rotatably about axis 13 mounted on the housing 12. In the position of FIGS. 2 and 3, in which the flattened portions 25 extend parallel to those sides of the protrusions 26 which face each other, the locks or latches 24 can be moved past the protrusions 26. If the locks or latches 24 are located on that side of the protrusions 26 which face the displaceable link 11, and if thereafter the link 11b is turned, the protrusions 26 will be firmly located in the range of movement of the latches or locks 24 which after relieving the link 11b positively impact upon the latch or lock shoulders 27 thereby firmly positioning the worn out link 11b relative to the housing 12. After the installation of the tensioning device 7b in the tire chain, the link 11 is by means of a screw driver, a round wire or the like turned relative to the housing 12 until the locks or latches 24 are free so that the tensioning device is changed to its tensioning condition. The shank 18 extends through narrow bores in the pertaining end cap 16 and in the annular disc 21 so that no soil can enter the housing.

In order to permit opening of the tire chain within the region of the tensioning device or devices, at least one link member of at least one tensioning device is designed as an open hook. According to the embodiment shown In FIG. 2, the two link members 10b and 11b are designed as open hooks so that the tensioning device 7b can easily as an entirety be disconnected from the rings 8 and can be mounted in a simple manner. The hook openings 28 are adjacent to the end caps 15, 16. The confining surfaces of said hook openings 28 merge with the fractional inner surfaces of the links 10b, 11b which are designed substantially as open rings with for instance circular cross sections. The inner surfaces of the two link members 10b, 11b form in those regions thereof in which said inner surfaces have the greatest distance from each other, engaging surfaces 29 for the rings 8 while the two engaging surfaces 29 are located symmetrically with regard to the axis 13. The link members are located within the imaginary continuation of the enveloping surface of housing 12 so that they are protected.

Instead of a helical pressure spring, also dish springs, a pneumatic hydraulic or hydropneumatic spring or springs may be employed which are respectively filled with air, gas, or oil, or other spring means may be employed. When employing a plurality of tensioning devices in a tire chain, not all tensioning devices must be able to be locked or latched. Thus, in FIG. 1, the tensioning device 7a is formed by a simple tension spring 20a which is not arranged in a housing. The helical tension spring 20a has its end provided with link members 10a, 11a, which for instance are formed by the bent ends of a spring wire. The spring wire from which the springs are bent may have a circular, oval, rectangular, or similar cross section. The tensioning device according to FIGS. 2 and 3 has substantially circular cross sections. The length of the tensioning device expediently amounts to from 150 to 500 mm.

Figures 4, 5:
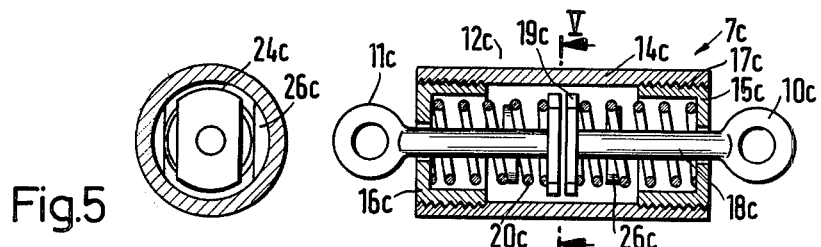
FIG. 4 illustrates an axial section through a further embodiment of the tensioning device according to the invention.
FIG. 5 is a section taken along the line V—V of FIG. 4.
Figures 6, 7:
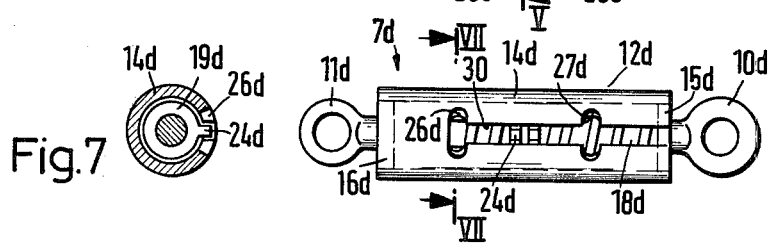
FIG. 6 represents a view of a further embodiment of a tensioning device according to the invention.
FIG. 7 represents a section taken along the line VII—VII of FIG. 6.
Figure 8:
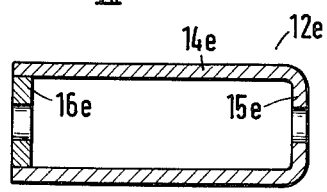
FIG. 8 is an axial section through a further embodiment of a tensioning device according to the invention.

In FIGS. 4 to 8, parts corresponding to those of FIGS. 1 to 3 are designated with the same reference as in FIGS. 1 to 3 but in FIGS. 4 and 5 the corresponding parts are designated with the additional index c, whereas in FIGS. 6 and 7, the corresponding parts are designated with the additional character d and in FIG. 8 are designated with the additional character e, etc. In the embodiment of FIGS. 4 and 5, both link members 10c, 11c are respectively by means of a shank 18c displaceably arranged in the housing 12c. The tensioning device 7c is symmetrically designed with regard to the central plane which is perpendicular to the axis of the tensioning device 7c. Each shank 18c is surrounded by a separate spring 20c which rests against the pertaining collar or flange 19c. The collars 19c are in the shortest condition of the tensioning device engaging each other expediently with those sides thereof which face each other. Each collar 19c forms two latches or locks 24c. The latches or locks 24c of each link member have two separate protrusions 26c. The protrusions or projections 26c are formed by webs which respectively have the form of a circular section and which by means of their curved edges are connected to the inner surface of the sleeve 14c. The sleeve 14c extends over the entire length of housing 12c. The two equally designed end caps 15c, 16c are inserted into the sleeve 14c in such a way that their outer end faces are flush with the end face of sleeve 14c. The end caps 15c, 16c have an outer thread which engages the inner thread 17c at the ends of the sleeve 14. The closed link members 10c, 11c are similarly designed and are of annular shape.

Springs 20 and 20c must be so designed that their windings can move past the protrusions or projections 26, 26c without being embedded. In order to realize this, either the outer diameter of the springs is less than the space between the projections, or the springs are, seen in axial view, not circular but are laterally flattened so that they are spaced by a shorter distance from the axis 13 over those sides of the projections which face the axis 13.

The tensioning device 7d according to FIGS. 6 and 7 likewise comprise two link members 10d, 11d which are displaceable relative to the housing 12d. The collars 19d of the shanks 18d are respectively provided with a radial cam or nose-shaped latch 24d which projects upon the outer circumference of said collars 19d. The distance of said latch 24d from the axis of the tensioning device is greater than half the inner diameter of housing 12d and at the maximum equals half the outer diameter of said housing 12d so that the latches 24d do not protrude beyond the outside of housing 12d. For purposes of guiding the latches 24d, a longitudinal slot 30 is provided in the sleeve 14d. The width of said longitudinal slot 30 is greater than the width of latch 24d only by the necessary play of movement.

The surfaces of said latch 24d which face the confining edges of the longitudinal slot 30 extending parallel to the housing are parallel to each other. For each latch 24d, the slot 30 has at least at one confining edge a widened portion 26d, shoulder 27d of which forms a lateral confinement for the pertaining latch 24d. In the illustrated embodiment, for each latch 24d there are respectively provided two equal slot-shaped broadened sections 26d which are located opposite to each other. If the respective link member 10d and 11d are pulled away from the housing 12d, the pertaining latch 24d moves into the region of a widened section 26d, whereby the link member can be locked. In view of this design, the tensioning device may have a very small outer diameter. The longitudinal slot 30 may extend over the entire length of the housing 12d, or sleeve 14d. In contrast thereto, the strength of the housing or of the sleeve can be increased by extending the longitudinal slot 30 only from one end of the housing to that broadened section 26d of the slot which is located farthest from said one end. The ends of the sleeves 14d are closed by annular discs 15d, 16d which are connected to sleeve 14d by means of welding seams. The housing 12e according to FIG. 8 has a deep drawn part which forms the mantle 14e as well as an end face 15e. The open end of this deep drawn part is closed by means of an annular disc 16e.

Figure 9:
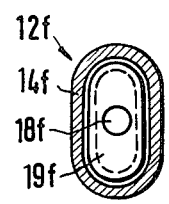
FIG. 9 represents a cross section through still another tensioning device of the invention.
Figure 10:
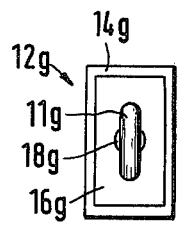
FIG. 10 is a longitudinal section through still another tensioning device of the present invention.

The housing 12f of the tensioning device according to FIG. 9 has a flat oval cross section. The shape of the collar 19f corresponds to the inner shape of the housing 12f. In condition of operation, the housing 12f of the tensioning device has one of the two flat sides engage the tire so that the tensioning device will project only relatively slightly behond the tire side surfaces. This advantage is also inherent to the tensioning device according to FIG. 10 the housing 12g of which has a flat rectangular cross section.

Figures 11, 12:
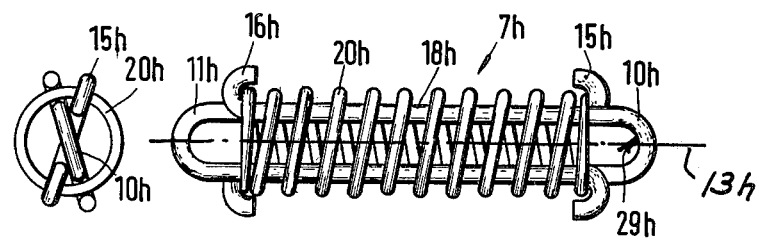
FIG. 11 is a view of a further tensioning device according to the invention.
FIG. 12 shows a longitudinal section through the tensioning device according to FIG. 11.

The tensioning device 7h illustrated in FIGS. 11 and 12 has no housing. The U-shaped link members 10h, 11h consist of wire which is bent and which has circular cross sections and is slightly thicker than the wire from which the spring 20h is made. The link members 10h, 11h rest against the ends of the pressure spring 20h the inner diameter of which approximately equals the width of the link members. The flattened end windings of the pressure spring 20h the end durfaces of which extend rectangularly to their central axis 13h, confine a receiving opening by means of inner surface 29h of the respective pertaining link member 10b, 11. Each link member has a pull part which comprises two parallel legs or pull members 18h and which extends to the other link member. Each pull member 18h extends parallel to the central axis 13h, extends beyond the length of the spring 20h and has its end which faces away from the pertaining link member provided with a connecting link for connection to the pertaining end of spring 20h. The legs 18h which are formed by extensions of the legs of the pertaining link member 10h and 11h or merge tangentially with the semi circular curved end section of the pertaining link member, slidably engage the inner surface of the windings of spring 20h so that the spring 20h is precisely aligned and safely guided. The central axes of the two legs 18h of each pull member are located in one plane. The pull parts may be turned relative to each other and relative to the spring 20h about the central axis 13h, and thereby may occupy the respective most favorable position.

The connecting member of each pull member is formed by the rearwardly curved ends 15h or 16h of the two pertaining legs 18h. The ends 15h of each pull member are curved outwardly in opposite directions and tangentially merge with the legs 18h. The clear width of the hook-shaped rearwardly curved ends 15h is only by the necessary play of movement greater than the diameter of the spring wire from which the spring 20h has been made. The two rearwardly curved ends 15h and 16h of each pull member are engaged by the spring 20h and more specifically by its pertaining end winding. The legs 18h and the pertaining link member 10h are respectively formed by a one-piece wire arc, while the two wire acrs are of the same design. As a result thereof, a tensioning device comprises only three individual parts which are easily detachably engaged. In view of the easy disengageability, a link member 10h the receiving opening of which is prior to the assembly of the spring 20h open between the legs 18h can directly be connected to a closed chain link of the tire chain without a particular disengageable intermediate member being necessary. After this chain link has been introduced into the link 10h, 11h, the pressure spring 20h is slipped over this link 10h onto the pertaining legs 18h. After spring 20h has been slipped over the link member 10h, the second wire yoke which comprises the link member 11h is with one leg 18h introduced into the receiving opening of the link member 10h and is subsequently with the link member 11h ahead pushed through the spring 20h until its ends 15 engage the pertaining end of spring 20h. A chain link is then inserted into this link member 11h, said last mentioned chain link being so wide that it cannot be pushed by spring 20. In the stretched-out position of the tensioning device 7h, in which the windings of spring 20 engage each other and the link members 10h, 11h have their greatest distance from each other, the tensioning device can be secured for instance by an insert member which at one end of the spring is inserted between the pertaining legs 18h and on one hand rests against the pertaining end surface of spring 20 and on the other hand against the inner surface 29 of the pertaining link member. For purposes of unlatching the tensioning device 7h, the insert member is pulled out of the link member. The tensioning device may in its stretching position also be secured by means of a clamp or the like. The said clamp extends over the ends of the compressed spring 20h, and is withdrawn for purposes of unlatching the tensioning device.

It is, of course, to be understood that the present invention is, by no means, limited to the specific showing in the drawings, but also comprises any modifications within the scope of the appended claims.

What I claim is:

1. In combination with a network of a tire chain having side chains and a sleeve including end faces and a slot, especially in a tensioning device integratable in side chains thereof, which provides a first link member having a guide shank including a locking device and a second link member releasably connected with adjoining chain elements in peripheral direction of the side chains, the link members being opposite each other with axial spacing therebetween and at least the first link member being axially shiftable against the sleeve as well as being latchable with the locking device relative to the sleeve in an extended position of the tensioning device, the locking device providing a locking means provided along the guide shank of the first link member and having a protrusion with opposing end surfaces arranged complementary thereto, the improvement therewith which comprises a compression spring movable within the sleeve in peripheral direction spaced from the protrusion, said spring having ends thereof braced against the sleeve and opposing end faces of the protrusion, the locking means including flange and collar means formed by the locking device of the guide shank, the flange and collar means comprising partially circular segmental webs having a bent outer surface connecting with an inner wall of the sleeve.

2. A tensioning device in combination according to claim 1, wherein the lock provides flattened portions parallel to each other.

3. A tensioning device in combination according to claim 1 wherein one link member is rigidly connected with a cap arranged fixedly and releasably on a pertaining free end of the sleeve.

4. A tensioning device in combination according to claim 1 wherein both link members are identical and each has a spring arranged therewith.

5. A tensioning device in combination according to claim 4 wherein each lock of the link members is arranged having flange and collar means therewith.

6. A tensioning device in combination according to claim 1 wherein end faces of the sleeve are formed by bottom releasable caps.

* * * * *